United States Patent [19]

Campbell

[11] 4,401,349
[45] Aug. 30, 1983

[54] BEARING ASSEMBLIES FOR SPINDLES

[75] Inventor: James S. Campbell, Kingston, Canada

[73] Assignee: Spintex, Inc., New York, N.Y.

[21] Appl. No.: 314,457

[22] Filed: Oct. 23, 1981

[51] Int. Cl.³ .......................... F16C 35/12; F16C 19/08
[52] U.S. Cl. .................................. 308/189 R; 308/236
[58] Field of Search ............... 308/187.1, 189 R, 190, 308/36.4, 236, 228, 229, 230; 74/617; 277/152; 403/2; 57/130, 135; 474/903

[56] References Cited

U.S. PATENT DOCUMENTS

| 705,093 | 7/1902 | Kelley | 74/617 |
|---|---|---|---|
| 2,424,013 | 7/1947 | Bechler | 308/189 R |
| 2,556,368 | 6/1951 | Hegeman | 308/189 R |
| 2,909,027 | 10/1959 | Treyer | 57/130 |
| 3,438,191 | 4/1969 | Kuznetsov et al. | 57/135 |
| 3,513,720 | 5/1970 | Allport | 403/2 X |
| 3,618,411 | 11/1971 | Rottweiler | 474/903 X |
| 4,141,606 | 2/1979 | Yamamura | 308/189 R X |

FOREIGN PATENT DOCUMENTS 972394 1/1951 France .................... 308/189

Primary Examiner—Stuart S. Levy
Assistant Examiner—David Werner
Attorney, Agent, or Firm—Berman, Aisenberg & Platt

[57] ABSTRACT

The invention provides a new and useful bearing assembly and a spindle utilizing that assembly. The assembly comprising a housing adapted to be secured in a support member, the housing having arranged coaxially therein a cylindrical cavity, a first cylindrical aperture between the cavity and the exterior of a first end of the housing, and an at least partially threaded second cylindrical aperture between the cavity and a second end of the housing, the second aperture being of equal or greater diameter than the cavity; the cavity having arranged therein coaxially therewith, in abutting relation and of outside diameter sufficiently less than the diameter of the cavity to allow sliding movement therein, and in order from the first end, a spacer, a first sealed radial bearing, a second spacer, and a second sealed radial bearing, each of the spacers being of generally cylindrical configuration and of an inside diameter such that the spacers abut the edge of only the outer races of the bearings; the second aperture having threadably engaged therewith an end screw plug, the screw plug having a cylindrical aperture therethrough coaxial with the second aperture and of larger diameter than the inner diameter of the bearings, the face of the screw plug having a cylindrical protrusion thereon to abut the edge of only the outer race of the second bearing; the spacers, bearings and end screw being of predetermined width such that the end screw holds the bearings and the spacers against the wall of the first end of the cavity to thereby prevent axial movement of the bearings within the assembly. Novel shaft, drive cog and dust cover are also provided for the assembly.

14 Claims, 2 Drawing Figures

BEARING ASSEMBLIES FOR SPINDLES

This invention relates to bearing assemblies for spindles and to spindles for use in the synthetic fibre industry, for example, in the twisting of synthetic yarns.

BACKGROUND OF THE INVENTION

In the synthetic fibre industry many thousands of high speed spindles are utilized in synthetic yarn production. Because of the extremely high speeds at which the machines operate, the spindles and bearing assemblies must be able to withstand speeds in the order of 25,000 rpms. As a result, the life expectancy of the spindles is short, presently being in the order of three months to one year for continuous operation. Since hundreds of thousands of these units are in use, replacement costs are very significant indeed.

This problem is magnified by the fact that the entire spindle assembly must generally be discarded in favour of a new unit when bearing failure occurs. This has been brought about by the fact that the entire spindle unit is a sealed one and is not in the nature of a modular arrangement of parts which can be disassembled, for example, to remove a failed bearing and replace the bearing only. The high speeds at which the spindles operate combined with the close tolerances required in construction have prevented the use of a modular type construction heretofore.

It is, accordingly, an object of the present invention to provide a bearing assembly for a spindle and a spindle utilizing that bearing assembly in which the component parts are demountable so that failed parts can be replaced on an individual basis and the life of the assembly as a whole prolonged.

PRIOR ART

U.S. Pat. Nos. 2,909,027 granted Oct. 20, 1959 to Treyer and 3,438,191, granted Apr. 15, 1969, to Kuznetsov both provide assemblies for textile spindles. In each case, however, there are very substantial overall differences from the present invention.

As indicated above, prior art bearing assemblies and spindles currently in industrial use are characterized by the fact that the bearing assembly is a sealed unit and cannot be disassembled for the replacement of component parts. Generally, in order to expose the bearings, the housing must be broken away. Furthermore, in these prior art designs bearing failure generally results in destruction of the spindle shaft, because of the particular arrangement of the bearings around the shaft.

The net result is that it is not practical nor economical, using current designs, to rebuild bearing assemblies and spindles. Thus, failed units are generally discarded in favour of replacement of the entire unit.

Furthermore, it is currently not practical to repetitively remove a spindle assembly from its drive cog. Present devices utilize a system wherein the drive cog is secured to the spindle shaft by a press fit. The spindle shaft is of hardened steel and the drive cog of powder metal. When the shaft is inserted into the cog to form the press fit, the cog bore is permanently enlarged. Subsequent removal and reinsertion of a shaft yields a somewhat looser fit. After two or three such replacements, the press fit is no longer present and a new cog is required.

SUMMARY OF THE INVENTION

A bearing assembly and a spindle unit utilizing that assembly have now been developed which allow for disassembly for replacement of parts, such as individual failed bearings.

Thus, the invention provides a bearing assembly for a spindle shaft comprising a housing adapted to be secured in a support member, said housing having arranged coaxially therein a cylindrical cavity, a first cylindrical aperture between said cavity and the exterior of a first end of said housing, and an at least partially threaded second cylindrical aperture between said cavity and a second end of said housing, said second aperture being of equal or greater diameter than said cavity; said cavity having arranged therein coaxially therewith, in abutting relation and of outside diameter sufficiently less than the diameter of said cavity to allow sliding movement therein, and in order from said first end, a spacer, a first sealed radial bearing, a second spacer, and a second sealed radial bearing, each of said spacers being of generally cylindrical configuration and of an inside diameter such that the spacers abut the edge of only the outer races of the bearings; said second aperture having threadably engaged therewith an end screw plug, said screw plug having a cylindrical aperture therethrough coaxial with said second aperture and of larger diameter than the inner diameter of said bearings, the face of said screw plug having a cylindrical protusion thereon to abut the edge of only the outer race of said second bearing; said spacers, bearings and end screw being of predetermined width such that said end screw holds said bearings and said spacers against the wall of the first end of said cavity to thereby prevent axial movement of the bearings within said assembly.

GENERAL DESCRIPTION

As indicated, the invention relates generally to assemblies for spindles in the synthetic textile industry. There are in general terms three parts to the overall spindle assembly. These are the bearing assembly, the spindle shaft and the drive cog. The present invention provides improvements in each of these parts.

Beginning with the heart of the assembly, a new bearing assembly is provided which, as indicated above, will permit the disassembly of the unit for purposes of replacement of individual failed parts.

The bearing assembly includes a housing having an elongated cylindrical chamber within it. At the bottom of the chamber a cylindrical aperture is provided between the chamber and the exterior of the housing. The aperture is of smaller diameter than the chamber. At the upper end of the chamber a threaded aperture is provided between the chamber and the exterior of the housing. The diameter of the threaded aperture is at least as great as that of the chamber. The chamber and each of the apertures are coaxial in the housing.

Within the chamber, coaxial with it, and in order from the bottom to the top are a threaded end plug, a sealed radial ballbearing, or needle bearing a cylindrical spacer and a second bearing. The exterior of each of these units with the exception of the end plug is cylindrical in form and the outside dimension is just less than the inside dimension of the chamber, so that each part can be slid into the chamber through the threaded aperture. The threaded end plug is then screwed into the threaded aperture to secure the assembly against axial displacement.

Each of these parts includes an axial cylindrical aperture therethrough to accomodate a spindle shaft. The inside diameter of the end plugs and the spacer is greater than that of the inner races of the bearings.

The two end plugs and the spacer are constructed so that they contact the bearings only around the edges of the stationary outer races. The interior races of the bearings are thus free to rotate.

It is therefore clear that this bearing assembly as described can be readily disassembled by removal of the threaded end plug and subsequent removal through the threaded aperture of the remaining parts.

In a further aspect, the invention includes in the assembly a spindle shaft. The outside diameter of the shaft is less than the inside diameter of the cylindrical aperture through the two end plugs and the spacer. In operation there must be no contact between the sides of these apertures and the shaft. The exterior diameter of the shaft is just sufficiently less than the inside diameter of the bearing to allow the shaft to be inserted through the bearings but to allow contact between the shaft and the inner races of the bearings. In the area of contact with the bearing the shaft is provided with a surface texture which will serve as a reservoir for an adhesive which locks the shaft to the bearing. The bond provided by the adhesive between the shaft and the bearings is frangible and, while it is of sufficient strength to maintain the unity between the bearing and the shaft in operation of the spindle, in the event of a bearing failure, the bond can be broken and the shaft removed to allow subsequent disassembly of the bearing assembly and replacement of the bearing.

A final aspect of the invention involves the manner of locking the drive cog to the shaft. It has generally been the case in industry to utilize a press fit between the cog wheel and the bearing shaft. Thus, if for any reason the cog wheel must be removed from the shaft, the press fit upon replacement of the cog wheel is a looser fit. Any subsequent removal of the cog wheel may well destroy the fit completely. Thus this further aspect of the present invention provides a shaft having a flattened side at the bottom end thereof and a cog wheel having a mating aperture therethrough so that there is a positive drive connection between the cog wheel and the shaft. A locking screw can be utilized through the side surface of the drive cog to the flat surface of the shaft to control axial movement of the cog wheel.

BRIEF DESCRIPTION OF THE DRAWINGS

In drawings which illustrate embodiments of the invention.

DETAILED DESCRIPTION

Figure 1:
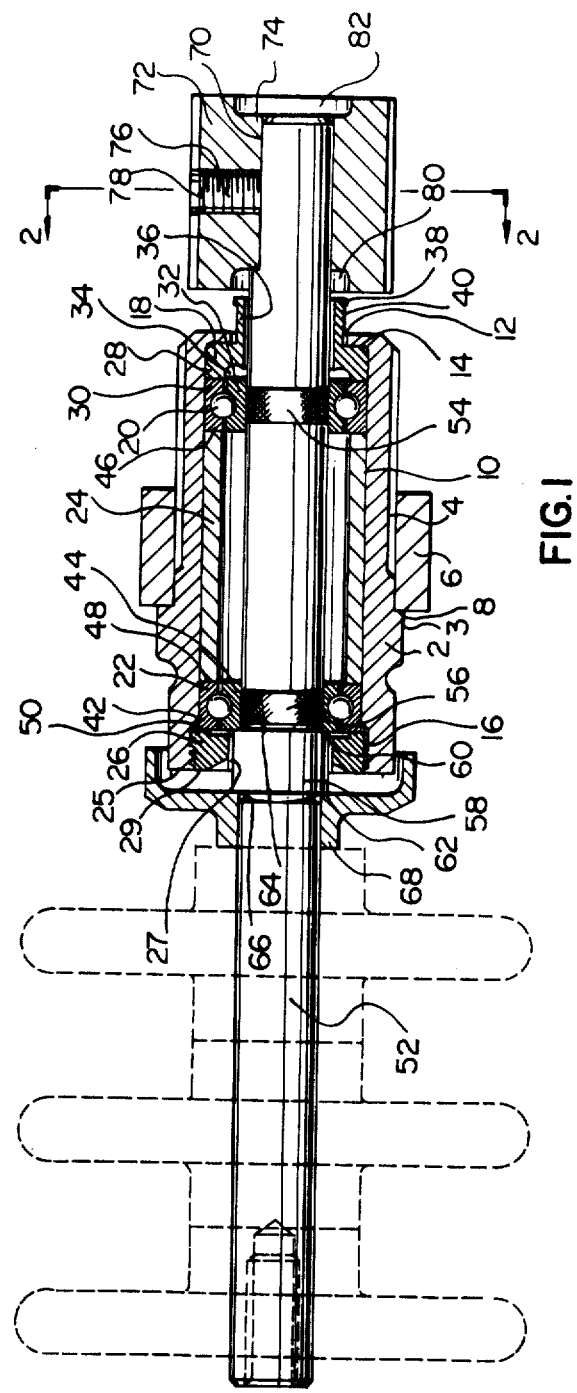
FIG. 1 is an elevation of a complete spindle assembly shown partly in section.
Figure 2:
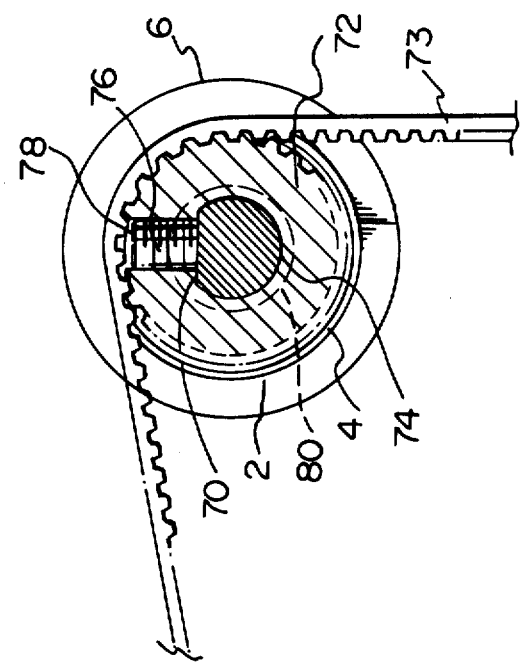
FIG. 2 is a bottom plan view of the bottom end of the shaft with the cog in place.

In the preferred configuration, the bearing assembly consists of the housing 2 which has a threaded portion 4 for securing the housing 2 to the supporting structure 6. The housing 2 is provided with flattened areas as at 3 to accommodate a tightening tool. The exterior surface of the housing includes a shoulder 8 which abuts against the supporting structure 6 to accurately locate the housing axially. The housing includes the cylindrical chamber 10 which is open to the exterior of the lower end of the housing 2 by way of the cylindrical aperture 12 which is coaxial with the chamber and of smaller diameter than the chamber. The reduced diameter of the aperture 12 leaves an annular lower surface 14 at the bottom of the chamber 10. The chamber 10 is open to the exterior of the housing at the top thereof by the cylindrical threaded aperture 16 which is coaxial with chamber 10 and of at least equal diameter therewith. The threaded aperture 16 is preferably of greater diameter than that of the chamber 10.

The chamber 10 contains in order from bottom to top the end plug 18, the radial ballbearings or needle bearings 20 and 22 separated by spacer 24, and the threaded end plug 26.

The end cap 18 is preferably shaped to perform a number of functions. First, the basic structure 18 serves as a spacer to accurately locate the lower bearing 20 relative to the lower end 14 of the chamber 10. The outer ring structure 28 of cap 18 is constructed so that it contacts only the stationary outer race 30 of the bearing 20. There is thus no contact between cap 18 and the inner race 32 of bearing 20. The space 34 serves as a reservoir for lubricant and contaminants which may drop through the bearing assembly. The section 36 of end cap 18 which protrudes through the aperture 12 and terminates with the annular lip 38 provides a convenient surface 40 around which members having hook-like ends are conventionally utilized to move banks of spindles in and out of the operating position in the support structure.

The bearings 20 and 22 are preferably conventional radial ballbearings, although other suitable bearings such as needle bearings would suffice. In this assembly the outer races 30 and 42 of bearings 20 and 22 are desigend to remain stationary in the housing, while the corresponding inner races 32 and 44 are free to rotate.

A hollow cylindrical sleeve or spacer 24 serves to retain the proper axial spacing between bearings 20 and 22. The inside diameter of the spacer is such that the ends 46 and 48 of the spacer contact only the edges of the outer races 30 and 42 of bearings 20 and 22 respectively. Any interference with freedom to rotate of the inner races of the bearings is thus avoided.

The assembly is held securely in position against axial movement by the end plug 26. This plug is simply tightened in the threaded aperture 16 to lock the remaining components of the assembly into axial position. The top surface 29 of plug 26 ought not to project above the top surface 25 of the housing 2. The plug 26 is constructed on its lower side with an exterior ring-like member 50 which, as with the end cap and spacer, serves to ensure that there is contact only with the outer race 42 of the bearing 22. The plug 26 is provided with appropriate indentation or the like to receive corresponding projections or the like on a tightening tool.

It will be evident that the assembly can be completely disassembled by removing the end plug 26 and sliding the remaining components through the aperture 16. The outside diameter of the end cap 18, the bearings 20 and 22 and the spacer 24 is just sufficiently less than the inside diameter of the chamber 10 to allow the components to be readily slid into and out of the chamber.

It will thus be evident that a bearing assembly has been described in which the bearings can be accurately positioned axially within the housing and from which they are readily removable.

In a further aspect, a novel spindle shaft is provided for use with the bearing assembly.

The spindle shaft 52 is inserted through the bearing assembly and secured to the inner races 32 and 44 of bearings 20 and 22 by an adhesive. The shaft 52 is thus supported by the said inner races for rotation therewith.

In the areas 54 and 56 adjacent the bearing surfaces the surface of the shaft is textured to provide a reservoir for adhesive. In the preferred case the texture is provided by applying a cross hatched pattern to the shaft 52 prior to finish machining, so that when the shaft is ready for insertion, a minute cross hatched pattern remains on the surface. Adhesive is applied to the cross hatched area and the shaft secured to the inner race of the bearings.

The adhesive is chosen to provide a frangible bond. Thus, while the bond is adequate to secure the shaft to the bearings for operational purposes, it is of such strength that it can readily be broken when it is desired to separate the shaft from the bearings as for maintenance purposes. Thus, in the event of a bearing failure, even with the adhesive bond, the assembly can be broken down into its components for replacement of the defective bearing. This can be done without damage to the shaft.

In order to ensure the precise axial positioning of the shaft that is necessary in the industry, a raised portion 58 is provided on the shaft having shoulders 60 and 62. The shoulder 60 abuts against the edge of the inner race 44 of the bearing 22 to provide the axial positioning. Groove 64 is provided adjacent the shoulder 60 to allow for a snugger more accurate positioning of the shoulder 60 and the bearing 22. The outer diameter of the raised portion 58 must clearly be such as to readily clear the aperture 27 in the end plug 26.

In some applications a dust cover 68 is provided on the shaft 52 and preferably extending cap like over the top of the bearing assembly. The cover 68 is supported at the shoulder 62 of the raised portion 58 of shaft 52. Groove 66 is provided adjacent shoulder 62 to improve the positioning of the cover 68. Cover 68 is in press fit relation with shaft 52.

In the preferred embodiment, shaft 52 is provided at its lower end with a flattened side 70. The cog 72, driven by belt 73, is provided with a keyed aperture 74 having a flattened side corresponding to the flattened side 70 of shaft 52. The cog 72 can thus be slid onto the shaft 52 with the adjacent flattened portions providing positive drive from the cog to the shaft. Axial displacement of cog 72 is prevented by a locking screw 76 which is located in a threaded aperture 78 extending from the outer surface of cog 72 through to the flattened side of the aperture 74. The screw 76 can thus be tightened down against the flattened portion 70 of shaft 52 to secure the drive cog on the shaft.

The drive cog 72 is provided at each end thereof with recesses 80 and 82. As illustrated in FIG. 1, the recess 80 serves as a collector of lubricant or waste materials falling from the bearing assembly and thus aides in prevention of contamination of process fibres. The presence of the recess 82 at the lower end of the cog wheel, shown in FIG. 1, simply allows the cog wheel to be reversed, thus contributing to increased life expectancy.

There has thus been described a novel bearing assembly for spindles which will withstand the rigorous requirements of use in the synthetic fibre industry and yet is modular in nature and can be disassembled for replacement of defective parts without the destruction of the entire assembly. In a further aspect of the invention the bearing assembly includes a spindle shaft which is accurately positionable axially to meet the stringent requirements of the industry. A third major aspect of the invention which has been described is the novel reversible cog which provides positive drive to the spindle shaft.

Thus it is apparent that there has been provided in accordance with the invention a bearing assembly for a spindle shaft that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What I claim as my invention:

1. A bearing assembly for a spindle shaft comprising:
   a housing adapted to be secured in a support member, said housing having arranged coaxially therein a cylindrical cavity, a first cylindrical aperture having an end wall and being located between said cavity and the exterior of a first end of said housing, and an at least partially threaded second cylindrical aperture between said cavity and a second end of said housing, said second aperture being of equal or greater diameter than said cavity;
   said cavity having arranged therein coaxially therewith, in abutting relation and of outside diameter sufficiently less than the diameter of said cavity to allow sliding movement therein, and in order from said first end, a first spacer, a first sealed radial bearing, a second spacer, and a second sealed radial bearing, each of said spacers being of generally cylindrical configuration and of an inside diameter such that an end edge of the spacers abut the edge of only the outer races of the bearings;
   said second aperture having threadably engaged therewith an end screw plug, said screw plug having a cylindrical aperture therethrough coaxial with said second aperture and of larger diameter than the inner diameter of said bearings, the face of said screw plug having a cylindrical protusion thereon to abut the edge of only the outer race of said second bearing;
   said spacers, bearings and end screw being of predetermined width such that said end screw holds said bearings and said spacers against the wall of the first end of said cavity to thereby prevent axial movement of the bearings within said assembly.

2. The assembly of claim 1 wherein said first spacer includes a first ring-like cylindrical section adjacent said first bearing, a second smaller diameter cylindrical portion extending from the end of said chamber through said first aperture for a predetermined distance beyond the end of said housing and terminating in a raised lip, and a third ring-like portion joining said first and second portions, said third portion abutting the end wall of said chamber.

3. The assembly of claim 1 wherein said second spacer is a hollow cylinder having relatively thin walls the ends of which bear against the sides of the outer races of said bearings.

4. The assembly of claim 1 wherein a portion of said housing is externally threaded for securing said housing to an internally threaded aperture in said support member.

5. The assembly of claim 1 including, in addition, an elongated substantially cylindrical spindle shaft extending through said assembly and frangibly secured to the inner races of said bearings.

6. The assembly of claim 5 wherein said shaft is frangibly secured to said inner races by an adhesive.

7. The assembly of claim 6 wherein the shaft surface is textured to provide a reservoir for said adhesive in the areas of contact with said inner races.

8. The assembly of claim 7 wherein said surface is textured in a cross-hatched pattern of very small grooves.

9. The assembly of claim 5 wherein said shaft includes therearound a raised portion forming a shoulder so positioned along said shaft that when the shaft is so secured to said inner races, the outer edge of the inner race of said second bearing abuts against said shoulder.

10. The assembly of claim 9 wherein said raised portion extends through said second aperture to form a second raised shoulder outside of said housing.

11. The assembly of claim 10 including, in addition, a dust cover having an inverted cup-shaped section over the top of said housing and having a cylindrical aperture therethrough which said shaft passes, said cover located on said shaft such that the inner surface of said dust cover adjacent said aperture abuts against said second shoulder.

12. The assembly of claim 5 wherein a section of said shaft adjacent the bottom end thereof is flattened on one side.

13. The assembly of claim 12 including, in addition, a drive cog of substantially cylindrical configuration and having a cylindrical aperture therethrough through which said shaft passes, said cog being removably secured to the flattened section of said shaft.

14. The assembly of claim 13 wherein said cog includes a threaded cylindrical aperture extending through the side thereof adjacent said flattened section and a screw in said aperture tightened against said flattened section to secure said cog against rotation relative to said shaft.

* * * * *